Patented June 28, 1938

2,122,297

UNITED STATES PATENT OFFICE 2,122,297

WEATHER RESISTANT PIGMENT

Harold F. Saunders, Chicago, Ill., assignor to The Sherwin-Williams Company, Cleveland, Ohio, a corporation of Ohio No Drawing. Continuation of application Serial No. 704,135, December 27, 1933. This application March 2, 1936, Serial No. 66,631

2 Claims. (Cl. 134—78)

This invention relates to the manufacture of a pigment composed essentially of zinc sulphide and calcium sulphate; and has for its object provision of certain improvements in the manufacture of such pigment.

Calcium base, zinc sulphide pigment is used in the paint industry to replace lithopone when certain effects such as increased opacity without change in pigment-to-vehicle ratio or increased flatness in the finish are desired. The pigment may be manufactured by precipitation of the base of hydrated calcium sulphate from a solution of zinc sulphate with calcium chloride and then causing zinc sulphide to precipitate in a highly dispersed form on this base by addition of sodium sulphide, as shown in my pending patent application, Serial No. 56,233, or by a mechanical mixture of zinc sulphide with a specially calcined calcium sulphate as described in my pending application Serial No. 699,429, now Patent No. 2,041,618, patented May 19, 1936.

I have found that a difference exists in the resistance to weathering of paints made up from calcium base-zinc sulphide pigment when exposed under unfavorable conditions, depending to a considerable extent upon the character of the calcium sulphate base used in their production; that is, an improvement in the weathering of a paint is attained when the calcium base pigment used is made up on a relatively hard crystalline base such as of a properly prepared natural or spar calcium sulphate as against one made up on the more nearly amorphous precipitated calcium sulphate base, and that a pigment of improved weather resisting character may be produced by precipitating highly dispersed zinc sulphide directly upon a base consisting of natural calcium sulphate previously calcined at a temperature sufficiently high and under such conditions as to render it non-setting and of low water absorptive properties as, for example, as disclosed in my prior application Serial No. 699,564, filed November 24, 1933.

The present invention, which was described and claimed in my prior application Serial No. 704,135, of which this application is a continuation, contemplates the production of such an improved pigment and in carrying out the process of the invention the ratio of calcium sulphate to zinc sulphide in the pigment may be varied in order to produce any desired percentage of zinc sulphide to calcium sulphate; the opacity of the pigment being proportional to the increase in zinc sulphide content. This change in ratio of zinc sulphide to calcium sulphate is effected simply by use of greater or lesser proportion of the calcium sulphate base in the process as set forth in the following example according to predetermined calculation for the ratio desired.

A pigment made in accordance with this invention and containing approximately 41.7% of ZnS, and corresponding to the molecular proportion $CaSO_4.ZnS$, is found to possess excellent paint making characteristics; and paints made therefrom show superior resistance to weathering under adverse conditions, with sufficient opacity for all ordinary requirements.

In carrying out this procedure a quantity of highly purified zinc sulphate liquor of about 30° Bé. and of between 4.7 and 5.4 pH value (as determined by electrometric titration) and which is equivalent to 1615 lbs. of actual $ZnSO_4$ is run into a tank provided with an efficient mechanical agitator, and 1350 lbs. of a natural calcium sulphate previously calcined at between 650°–850° C., and under controlled conditions as disclosed in my application Serial No. 699,564, is added and thoroughly distributed by means of the agitator. In my prior application Serial No. 704,135 of which this application is a continuation I specified a pH range for the zinc sulphate solution of from 5.4 to 6.0 and these values represented colorimetric determinations, the difference between the two sets of values indicating merely the normal difference in values obtained for the same material by the two methods of determination. It is important to hold the pH of the zinc sulphate liquor substantially within the limits specified because I have discovered that the reactions and the qualities of the resultant product are materially affected by the pH value. As a result of tests of commercial zinc sulphate obtained from several different sources I have found that the solutions of these materials at a given concentration have substantially uniform pH values which, for a concentration of one gram per liter, averages about 6.5. Therefore, to secure the optimum results I have found that the acid value of the zinc sulphate solution used should be increased to bring it within the range specified above, and this is done by adding $H_2SO_4$ to the solution.

After the calcium sulphate has been added as above an aqueous solution of sodium sulphide is run into the suspension, while maintaining agitation, until an excess of sulphide is present in the reaction mixture as determined by the following test:

A sample of the suspension is filtered and 25 cc. of the filtrate is titrated with N/50 iodine solution. The proper excess of sulphide is indicated when between 6 and 10 cc. of N/50 iodine solution is required. Agitation is continued for one hour, the precipitate washed, and the slurry then passed to a filter whereby the proportion of water is reduced. The wet cake is dried and calcined in the usual manner in a neutral atmosphere, quenched in water, separated from the water by filtration, dried and disintegrated.

The product thus obtained, when used as a pigment for outside paint, according to an approved standard formulation, has been proven by outside exposure tests in comparison with ordinary calcium base lithopone paint of the same formulation, to possess materially better weather resisting qualities, better color and hiding power. Because of these superior qualities the pigment made in accordance with my invention overcomes the objectionable qualities of prior calcium base lithopones and a low-cost pigment adapted for extensive commercial use is provided.

In my preferred practice I obtain a pigment containing 50% ZnS by reducing the amount of calcium sulphate used to 970 lbs. and the opacity of this pigment compares very favorably to that of titanium-calcium pigments.

Having thus described my invention, I claim:

1. The hereindescribed process of forming a pigment which consists in the addition of natural calcium sulphate, which has been calcined at a temperature of from 650° C. to 850° C., to an aqueous solution of zinc sulphate having a pH value of from 4.7 to 5.4 as determined by the electrometric method, precipitating zinc sulphide from the solution by the addition of a soluble sulphide thereto, separation of the solids from the suspension liquor, washing the solids with water and separating them from the wash water, and then calcining the solids in a neutral atmosphere.

2. The hereindescribed process of forming a pigment which consists in the addition of calcium sulphate which has been calcined at a temperature of from 650° C. to 850° C. to an aqueous solution of zinc sulphate having a pH value of from 4.7 to 5.4 as determined by the electrometric method, precipitating zinc sulphide from the solution by the addition of sodium sulphide thereto, separation of the solids from the suspension liquor, washing the solids with water and separating them from the wash water, and then calcining the solids in a neutral atmosphere.

HAROLD F. SAUNDERS.